US007184168B2

(12) United States Patent
Beckman et al.

(10) Patent No.: US 7,184,168 B2
(45) Date of Patent: Feb. 27, 2007

(54) PRINT APPROVAL OF VARIABLE DATA DOCUMENTS

(75) Inventors: Orhan E. Beckman, Camas, WA (US); Jennifer L. Farrell, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 973 days.

(21) Appl. No.: 10/135,109

(22) Filed: Apr. 30, 2002

(65) Prior Publication Data

US 2003/0202684 A1 Oct. 30, 2003

(51) Int. Cl.
*H04N 1/387* (2006.01)
*H04N 1/50* (2006.01)
*G06K 15/02* (2006.01)

(52) U.S. Cl. .................. 358/1.18; 358/537; 358/452
(58) Field of Classification Search ............... 382/112, 382/115, 103, 175; 358/1.18, 1.15, 1.16, 358/1.9, 504, 527, 537, 538, 452, 453; 715/517, 715/527

See application file for complete search history.

(56) References Cited

U.S. PATENT DOCUMENTS

| 4,015,524 | A | | 4/1977 | Herbert ..................... 101/247 |
| 4,376,158 | A | | 3/1983 | Spechler .................... 430/291 |
| 5,436,730 | A | * | 7/1995 | Hube ......................... 358/401 |
| H1708 | H | | 2/1998 | Davidson et al. ...... 364/479.01 |
| 6,188,766 | B1 | * | 2/2001 | Kocher ....................... 380/246 |
| 6,752,312 | B1 | * | 6/2004 | Chamberlain et al. ...... 235/375 |
| 2001/0003823 | A1 | * | 6/2001 | Mighdoll et al. ........... 709/200 |
| 2003/0189612 | A1 | * | 10/2003 | Darby et al. ................ 347/19 |
| 2004/0205609 | A1 | * | 10/2004 | Milton et al. .............. 715/522 |

\* cited by examiner

*Primary Examiner*—Scott A. Rogers (57) ABSTRACT

Various systems and method for obtaining print approval for the printing of a variable data document by a print shop are provided. In one embodiment, a system is provided that includes a variable data document system employed to create a variable data document, the variable data document system providing for a digital specification of one or more elements of the variable data document. The system also includes a proofing portfolio that is associated with the variable data document system, the proofing portfolio including a physical embodiment of the one or more elements of the variable data document.

32 Claims, 6 Drawing Sheets

PRINT APPROVAL OF VARIABLE DATA DOCUMENTS

BACKGROUND

In the printing industry, it is a common practice to provide a "proof print" of a document to be mass-produced to a customer for approval before printing. This is done so that a customer may approve the colors, textures, and other features or elements of the document before it is mass-produced on a printing press. As such, a proof print often becomes a "contract proof" which is used as a benchmark by which the later mass produced prints are approved. Since proof prints are usually produced in limited quantities, they can be quite expensive.

Many print shops are making their printing services available on-line. Specifically, a user might be able to provide content and other specifics about a document to be printed on-line over the Internet. In some situations, a user might be able to view the document to be printed on a computer screen. It would be advantageous if a user could approve a document for printing based upon its appearance on a computer screen. In such a case, a user could provide remote approval for the mass printing of a document where the digital version of the document is employed as a print proof. Such a practice would avoid the costs of producing print proofs using printing presses.

Unfortunately, print proofing using digital images of documents is not entirely feasible. This is because there is usually a disparity between the appearance of a document on a computer screen and the physical appearance of the same document as printed on a printing press. As a result, a customer may like the appearance of a document as rendered on a computer screen, but may dislike the physical appearance of the document after printing.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
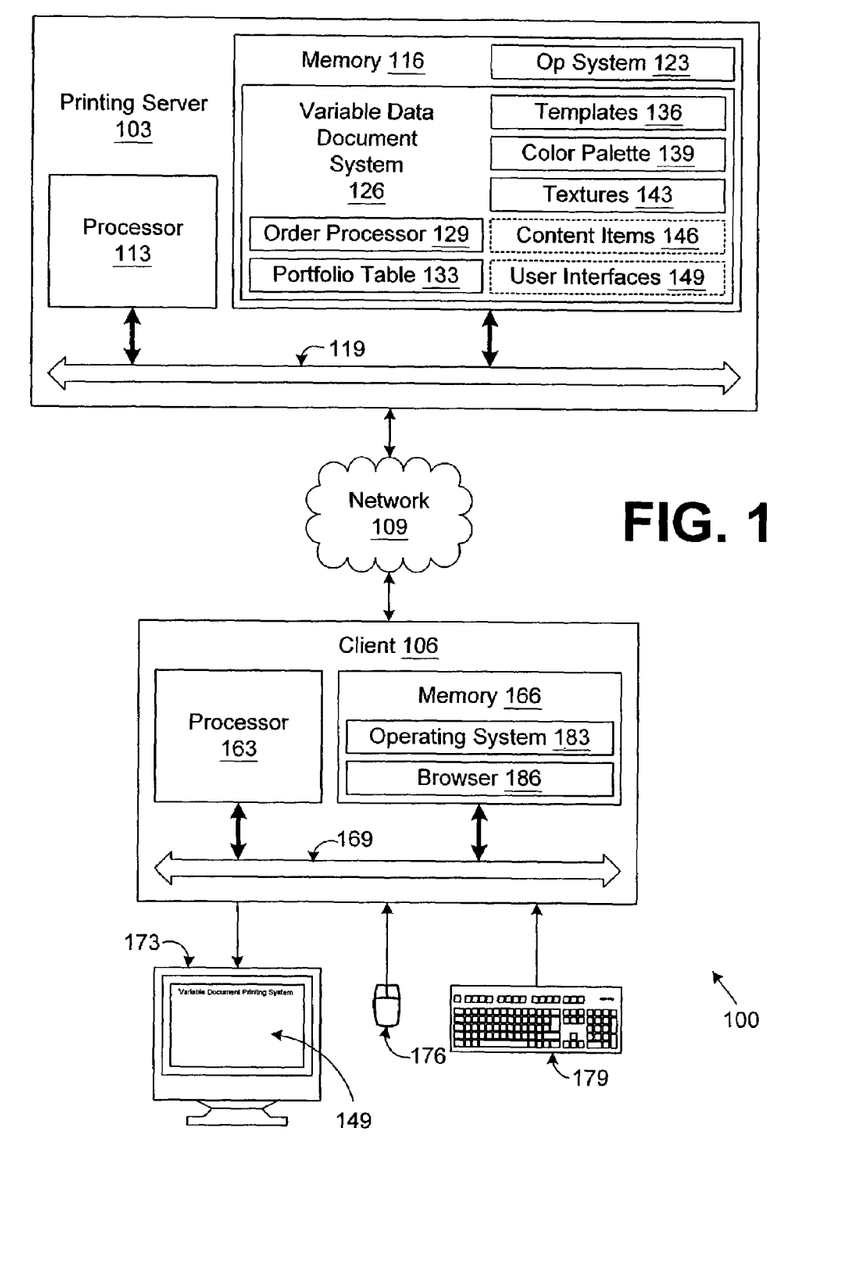
FIG. 1 is a block diagram of a network that includes a variable data document system that is employed to configure a variable data document according to an embodiment of the present invention.

With reference to FIG. 1, shown is a print network 100 that includes a printing server 103 and a client 106, both of which are coupled to a network 109. The printing server 103 may be owned and maintained, for example, by or for a print shop that provides printing services. The client 106 is operated by a user who seeks to employ the printing services of the print shop. In this regard, the print network 100 enables the user of the client 106 to create a variable data document by interfacing with a variable data document system on the print server 103 as will be described. The network 109 may include, for example, the Internet, intranets, wide area networks (WANs), local area networks, wireless networks, or other suitable networks, etc., or any combination of two or more such networks. Before a discussion of the operation of the print network 100 is provided in the context of various embodiments of the present invention, first a description of the physical makeup of the print network 100 and its components is provided.

The printing server 103 includes a processor circuit having a processor 113 and a memory 116, both of which are coupled to a local interface 119. In this respect, the local interface 119 may be, for example, a data bus with an accompanying control/address bus as can be appreciated by those with ordinary skill in the art. Thus, the printing server 103 may comprise, for example, a computer system or other device with like capability.

The printing server 103 also includes a number of software components that are stored on the memory 116 and are executable by the processor 113. These components include an operating system 123 and a variable data document system 126. The variable data document system 126 includes, for example, an order processor 129 and a portfolio table 133 that is employed by the processor 129. The variable data document system 126 also includes a number of templates 136, a color palette 139 with a number of colors, a number of textures 133 of documents to be printed, a number of content items 146 that may be included in such documents, and a number of user interfaces 149 that are displayed to a user on the client 106 to facilitate a user's interface with the variable data document system 126. In addition, the variable data document system 126 may include other components and functionality not discussed in detail herein, such functionality generally being known by those with ordinary skill in the art.

The client 106 also includes a processor circuit having a processor 163 and a memory 166, both of which are coupled to a local interface 169. In this respect, the local interface 169 may be, for example, a data bus with an accompanying control/address bus as can be appreciated by those with ordinary skill in the art. In this respect, the client 106 may be, for example, a computer system or other device with like capability. Client 106 also includes peripheral devices such as a display device 173, a mouse 176, and a keyboard 179. The client 106 may include other peripheral devices (not shown) such as, for example, a keypad, touch pad, touch screen, microphone, scanner, joystick, or one or more push buttons, etc. The peripheral devices may also include indicator lights, speakers, printers, etc. The display device 173 may be, for example, cathode ray tubes (CRTs), liquid crystal display screens, gas plasma-based flat panel displays, or other types of display devices, etc.

The client 106 also includes software components that are stored in the memory 166 and are executable by the processor 163. Such components include, for example, an operating system 183 and a browser 186. The browser 186 may be employed by the user of the client 106 to access various network pages other systems over the network 109. By manipulating the browser 186, the user may interface with the variable data document system 126 to configure a variable data document as will be described. In doing so, the user interfaces 149 that are included in the variable data document system 126 may be transmitted from the printing server 103 to the client 106 where the browser 186 causes such user interfaces 149 to be displayed on the display device 173. In this respect, the user interfaces 149 may include, network pages such as web pages available on the World Wide Web. The network pages may include static and/or dynamic content.

The memories 116 and 166 are defined herein as both volatile and nonvolatile memory and data storage components. Volatile components are those that do not retain data values upon loss of power. Nonvolatile components are those that retain data upon a loss of power. Thus, each of the memories 116 and 166 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 113 and 163 may represent multiple processors and each of the memories 116 and 166 may represent multiple memories that operate in parallel processing circuits, respectively. In such a case, each of the local interfaces 119 and 169 may be an appropriate network that facilitates communication between any two of the multiple processors, between any processor and any of the memories, or between any two of the memories, etc. The processors 113 and 163 may be electrical, optical, or molecular in nature as can be appreciated by those with ordinary skill in the art.

The operating systems 123 and 183 are executed to control the allocation and usage of hardware resources in the printing server 103 and the client 106, respectively, such as the memory, processing time and peripheral devices. In this manner, the operating systems 123 and 183 serve as the foundation on which applications depend as is generally known by those with ordinary skill in the art.

Figure 2A:
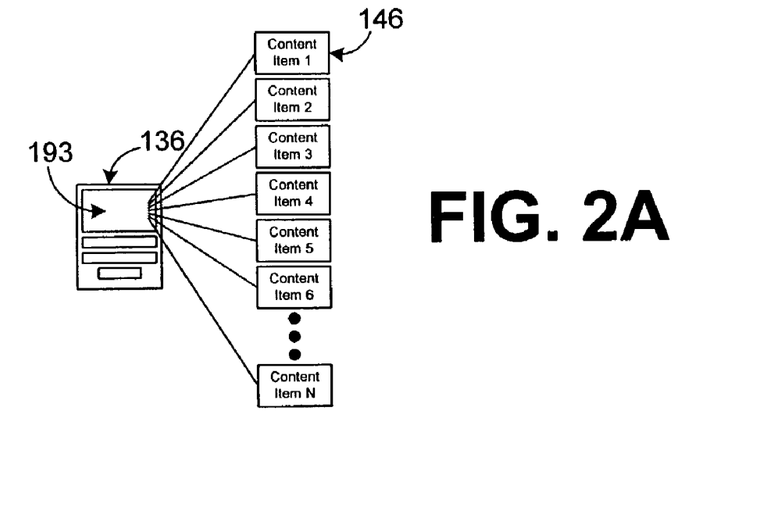
FIGS. 2A, 2B, and 2C are drawings of a number of elements that may be specified for a variable data document using the variable data document system of FIG. 1 according to an embodiment of the present invention.
Figure 2B:
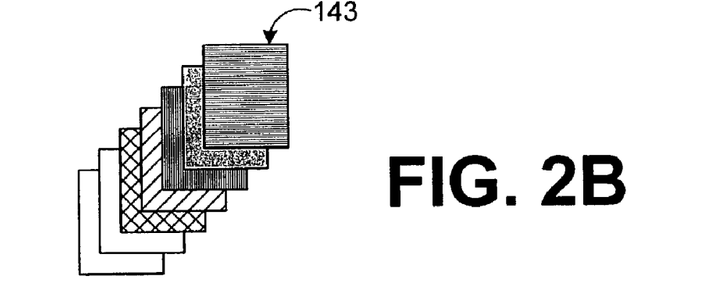
Figure 2C:
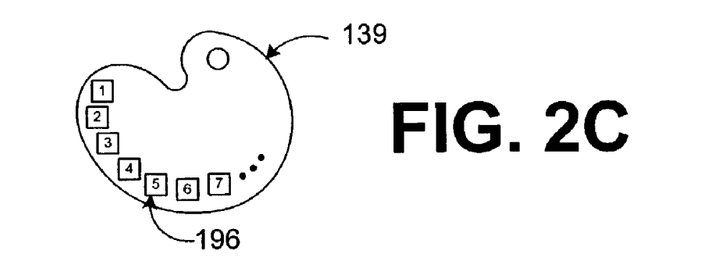

With reference to FIGS. 2A–2C, shown are various elements of a variable data document that may be specified in creating a variable data document using the variable data document system 126 (FIG. 1). As depicted in FIG. 2A, a variable data document may be created by using a template 136 that includes a number of copyholes 193. Given a specific template 136 that is used for a predefined variable data document, the variable data document system 126 facilitates the selection of one or more content items 146 to be populated into respective ones of the copyholes 193 of the template 136. In this respect, for predetermined ones of the copyholes 193, the variable data document system 126 provides the user with a predetermined number N of content items 146 from which a selection can be made of a particular content item 146 to be populated into the respective copyhole 193. The content items 146 may include images, text, or a combination thereof.

In addition, in FIG. 2B, a number of textures 143 are shown that relate to the texture of the media employed in printing the actual variable data document itself. For example a texture might be glossy or flat, etc. Finally, in FIG. 2C, a color palette 139 is shown having a number of colors 196 that are denoted by numbers as shown. The color palette 139 thus provides the user with a selection of colors to use in various predefined regions of a variable data document such as, for example, a background region or other region.

Thus, FIGS. 2A–2C provide examples of document elements such as content items 146, textures 143, colors 196, or other features that may be specified for a specific variable data document using the variable data document system 126.

Figure 3:
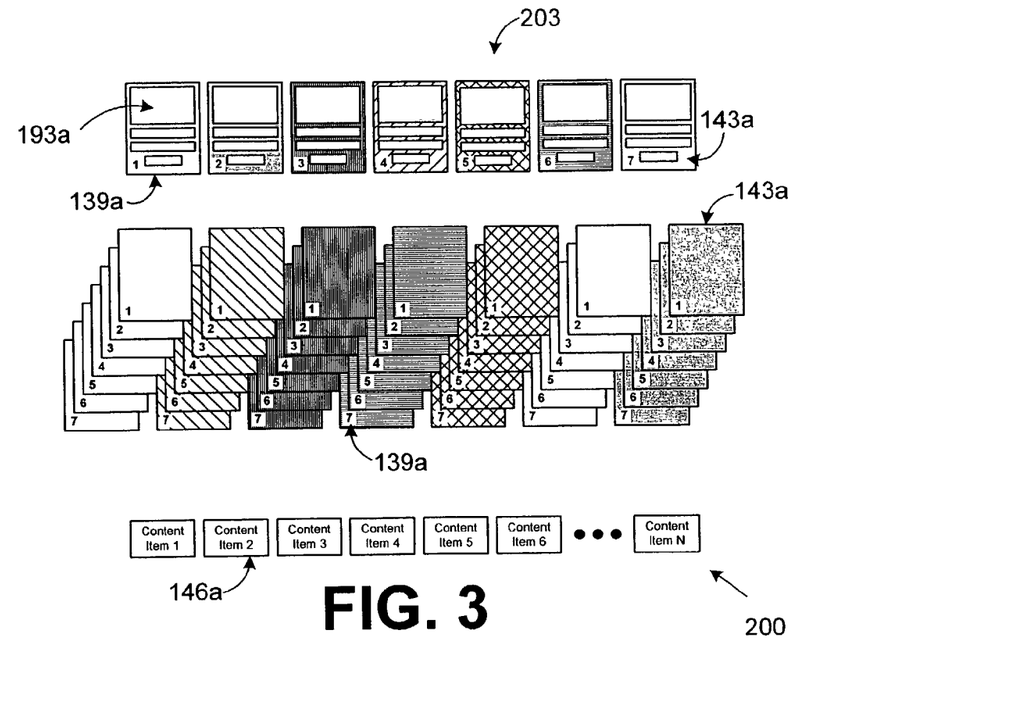
FIG. 3 is a schematic representation of a proofing portfolio having a number of physical embodiments of the elements selectable in the variable data document system of FIG. 1 according to an embodiment of the present invention.

With reference to FIG. 3, shown is a proofing portfolio 200 according to an aspect of the present invention. The proofing portfolio 200 is comprised of a number of physical sample documents 203. Each of the sample documents 203 includes various copyholes 193a that may or may not be populated with various content items 146a, etc. Each of the sample documents 203, operates as a texture sample 143a in that each sample document 203 includes a different texture as delineated by the fill pattern of the background of the sample documents 203 as shown in FIG. 3.

Each of the sample documents 203 also acts as a color sample 139a in that a number associated with each of the sample documents 203 indicates a background color that is applied thereto (the number being used to delineate color as the drawings are depicted in black and white). In addition, the proofing portfolio 200 also includes a number of texture samples 143a that also act as color samples 139a. In particular, each texture sample 143a includes a different texture such as predetermined gloss or other texture. Each of the texture samples 143a is duplicated in a variety of colors. Therefore, each of the texture samples 143a also operates as a color sample 139a. The proofing portfolio 200 also includes a number of content items 146a that are hardcopy versions of the content items 146 (FIG. 2A). Thus, the proofing portfolio 200 includes texture samples 143a, color samples 139a, and content items 146a that provide physical embodiments of these document elements that may be specified for a respective variable data document using the variable data document system 126 and viewed on the display device 173 where applicable (i.e. some textures 143 may not be capable of being rendered on the display device 173).

Figure 4:
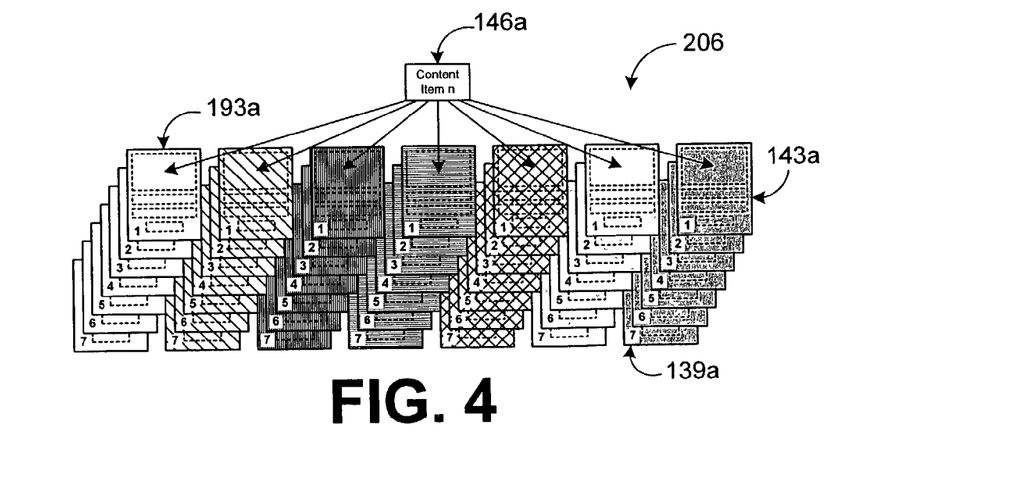
FIG. 4 is a schematic representation of additional features of the various elements in the proofing portfolio of FIG. 5 according to an embodiment of the present invention.

With reference to FIG. 4, shown are a number of template samples 206 that act as texture samples 143a and as color samples 139a. In addition, each of the template samples 206 includes one or more outlines of the boundaries of any copyholes 193a included thereon. The content items 146a are the same size or nearly the same size as respective copyholes 193a in the template samples 206. This allows the content items 146a to be placed on top of the template samples 206 in the location of the physical copyholes 193a so that an individual may obtain a general feel for a variable data document in terms of the color, texture, and appearance of the content items 146a thereon without having a proof copy of the document printed.

Referring then to FIGS. 1, 2A, 2B, 2C, 3, and 4 next a general discussion of the process is provided by which a variable data document may be specified by a user with the variable data document system 126. Also discussed is the generation of an order for mass printing of a predefined number of copies of the variable data document sent to a print shop according to an embodiment of the present invention. In the following process, the proofing portfolio 200 is employed as a contract proof for the order. To begin, a user wishes to create a variable data document using the variable data document system 126. The various selections of content items 146, colors 196, and textures 143 have been predefined in the variable data document system 126 thereby limiting the user's choice to such elements.

For example, assume that a user is an employee in a field office of a corporation that wants to generate a variable data document such as a brochure, etc., for their customers. The corporation wishes to make sure that the employee generates variable data documents for customers that meets predetermined quality standards. As such, graphical artists and other advertising experts within the corporation preset the options that are available to the employee to configure the variable data document in the variable data document system 126 for mass printing by a print shop. In order to generate the desired variable data document, the employee manipulates the browser 186 to access the variable data document system 126 over the network 109. Assuming that the company has configured several different types of variable data documents having particular copyholes that can be printed for various individuals in the company, then the employee may choose the desired document type, i.e. a brochure, that they wish to use from those variable data documents that are available.

Once the type of variable data document is selected, the employee then selects the various elements that are to be incorporated into the completed variable data document. To do so, the employee may make selections such as, for example, which ones of the content items 146 appear in respective copyholes 193 of the variable data document, the texture 143 that is to be employed in printing the variable data document, and any colors 196 for any predefined regions. To facilitate creating such selections, the variable data document system 126 transmits user interfaces 149 that the browser 186 interprets and displays on the display device 173 to facilitate interaction with the variable data document system 126 by the employee.

Assuming that the employee wishes to ensure that the appearance variable data document will satisfy his or her specific requirements, then the employee draws an association between the content items 146 displayed on the display device 173 and the content items 146a included in the proofing portfolio 200. This association is made while selecting the respective content items 146 for inclusion in the variable data document. In this respect, the print shop that provides the variable data document system 126 also provides the proofing portfolio 200 to the employee. This is done so that the employee can have physical documents that provide the actual appearance of the content items 146, the colors 196, and the texture 143 as these document elements will appear when produced in a mass print of the resulting variable data document on a printing press. In this manner, the employee can judge the actual texture 143a and color 139a of the variable data document before it is printed and provide approval for printing without obtaining a proofing copy of the variable data document for the employee's approval.

Thus in selecting the content items 146, colors 196 or textures 143, the employee draws associations between respective ones of these elements as depicted by the variable data document system 126 and as included in the proofing portfolio 200. Specifically, the employee may draw an association between one of the colors 196 rendered on the display device 173 and one of the color samples 139a in the proofing portfolio 100. Likewise, associations may be drawn between each one of the content items 146 as depicted on the display device 173 and the content items 146a. Also, associations may be drawn between the textures 143 that may be chosen by interfacing the variable data document system 126 and the texture samples 143a included in the proofing portfolio 200.

Drawing an association between elements viewed on the display device 173 and the same elements included in the proofing portfolio is necessary as the display device 173 may not accurately render the specific elements themselves. In particular, a hue of the colors 196 as depicted on the display device may differ from the same corresponding colors in the color samples 139a. Also, the color and appearance of the content items 146 may vary from the hardcopy versions of those content items 146. In addition, the display device 173 simply cannot provide a user with a feel of a document whereas the texture samples 143a provide such an opportunity.

Once all of the specific elements of the desired variable data document have been specified by the employee, then the employee manipulates appropriate user interfaces 149 to place an order for the printing of the variable data document itself. The proofing portfolio 200 then may be employed as a contract proof for the order in that it provides the specific colors 196, textures 143a, and appearance of the content items 146a that will be created by the printing press that was used to create the proofing portfolio. That is to say, the colors 196, textures 143a, and appearance of the content items 146a that are part of the documents printed pursuant to the order will be judged against the corresponding elements in the proofing portfolio.

In placing the order, the employee may provide a portfolio identifier that tells the print shop which proofing portfolio was viewed in generating the variable data document to be printed. This associates the proofing portfolio 200 with the order as a contract proof and provides needed information to the print shop to determine which printing press is to be used to print the variable data document that is the subject of the order. That is to say, the print shop maintains information associating each proofing portfolio 200 with a specific printing press. The employee may also furnish necessary information that the printer needs to print the document such as, for example, the quantity of copies that should be created and other information. The employee may also provide a print date upon which the proofing portfolio 200 was printed. Either the portfolio identifier or the print date may inform the print shop as to how old the proofing portfolio 200 actually is so that the print shop can determine whether the respective proofing portfolio 200 is valid as will be described. Alternatively, an expiration date may be printed on the proofing portfolio 200 to indicate when it is no longer valid. Also, the portfolio identifier, print date, and any other information provided by the employee to the print shop is printed on the proofing portfolio 200 itself.

The "validity" of the proofing portfolio 200 relates to whether the proofing portfolio can be legitimately used as a contract proof that a print shop will agree upon as the standard for printing quality for a particular print job. A proofing portfolio 200 may not be valid for a number of reasons. For example, a proofing portfolio 200 may be invalid after a predefined period of time due to variation in the print output of the associated printing press upon which the proofing portfolio 200 was printed. Specifically, the color tones and other aspects of a printing press may vary over time with continued use, etc. Given that the proofing portfolio 200 is provided to give an accurate picture of the colors and of the appearance of content items 146 as printed by the respective printing press, then due to variation in the print output of the associated printing press over time, the accuracy of the proofing portfolio 200 is placed in doubt after a sufficient time period has elapsed. Thus, when a sufficient period of time has elapsed after the printing of a respective proofing portfolio 200, it ceases to be valid. Another reason for invalidity is that the proofing portfolio 200 itself may vary in color over time due to exposure to ultraviolet rays of light. For example, some colors may gray over time. If this happens, then the proofing portfolio 200 would cease to accurately depict the colors as they would be printed by the associated printing press.

Consequently, the portfolio identifier or print date that is associated with a particular order provides the information to a print shop that is needed to determine whether the proofing portfolio 200 that was employed by the employee in configuring the respective data document is valid.

Once the order has been created by the employee, it is then transmitted to the printing server 103 of the print shop for printing via the network 109 (FIG. 1). When the print shop receives the order, the print shop determines whether the proofing portfolio 200 associated with the order by virtue of the portfolio identifier is valid. This may done, for example, by consulting the portfolio table 133 that is maintained with the variable data document system 126. The portfolio table 133 maintains records on all of the proofing portfolios 200 that have been created by respective printing presses for future validity determinations. Specifically, the portfolio table 133 may associate a printing press with a respective number of proofing portfolios 200. Also, the portfolio table 133 may associate a print date with each one of the proofing portfolios 200 so that the print shop may determine whether the proofing portfolio 200 is valid based on the portfolio identifier. Alternatively, such a determination may be made from a print date of the proofing portfolio 200 that is provided in the order. The portfolio identifier may also be used determine which printing press is to be used to print the variable data document that is the subject of the order. In any event, the determination as to validity of the proofing portfolio is made, for example, by comparing the age of the proofing portfolio 200 with a predefined time period. If the age of the proofing portfolio 200 is less than the predefined time period, it is valid.

Assuming that the printing portfolio 200 is valid, then the print shop will proceed to print the desired number of variable data documents that were ordered. Once printed, the variable data documents may then be delivered to the employee accordingly. On the other hand, if the proofing portfolio 200 that is associated with the respective order is invalid, then the print shop will notify the employee that the printing cannot be performed since proper proofing was not possible given the invalidity of the proofing portfolio 200 due to excessive age or other problems. It is noted that another reason for invalidity besides excessive age may be that the printing press used to generate to proofing portfolio 200 is no longer in service, etc.

Figure 5:
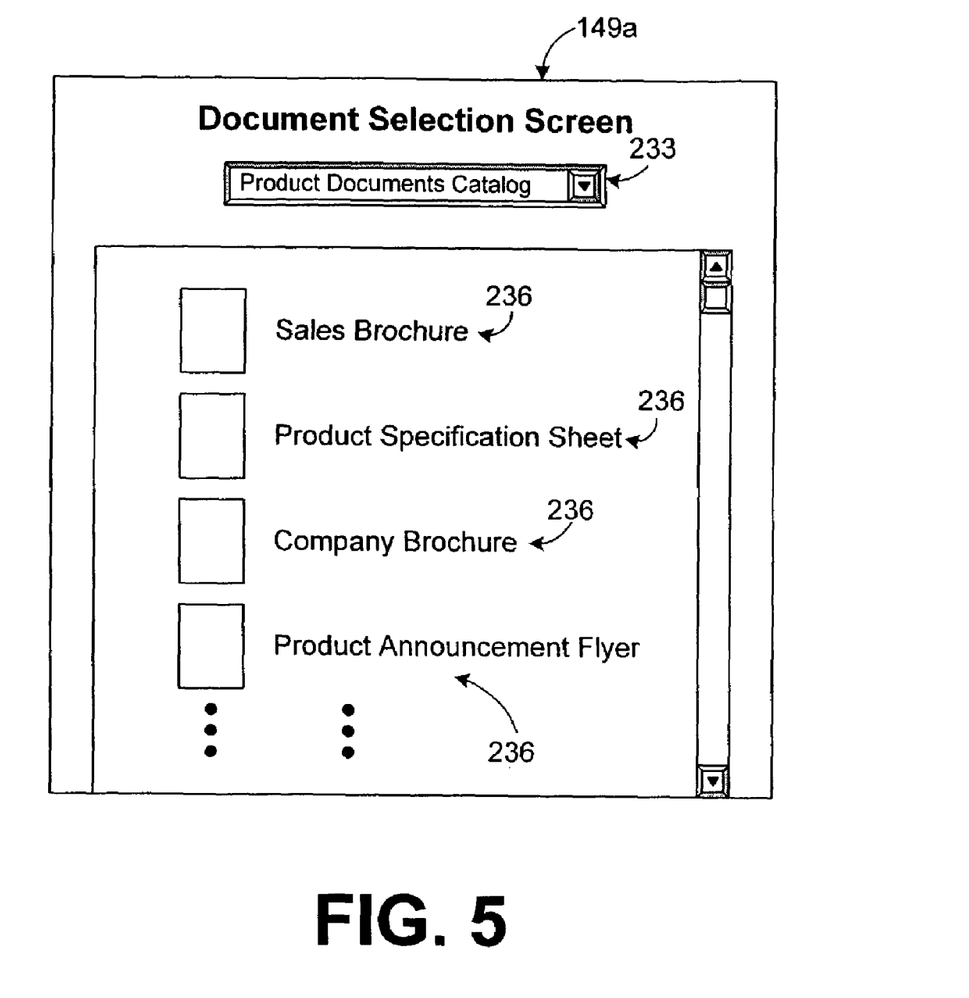
FIG. 5 is an exemplary first graphical user interface generated by the variable data document system of FIG. 1 to facilitate a user selection of a variable data document to be created according to an embodiment of the present invention.

Turning then to FIG. 5, shown is an exemplary first graphical user interface 149*a* used to interact with the variable data document system 126 (FIG. 1). The graphical user interface 149*a* provides the user with a number of different document catalogs 233 that may be selected by virtue of a pull down list or other selection interface. Associated with each catalog 233 are a number of variable data documents 236 that may be configured by the user. The user may be required to perform proper authentication so that a proper listing of catalogs may be provided for the specific user. In this respect, specific document catalogs 233 are associated with specific users, organizations, or other entities, such associations being maintained in an appropriate database or lookup table, etc. The user may manipulate the first graphical user interface 149*a* to select any one of the variable data documents 236 for configuration. Specifically, to select such a document, the user may position a cursor over the appropriate variable data document designation with the mouse 176 or keyboard. The user may then manipulate a button in the mouse 176 (FIG. 1) or keyboard, thereby "clicking" upon the variable data document as can be appreciated by those with ordinary skill in the art. Upon selecting one of the variable data documents listed 236 in the first graphical user interface 149*a*, then the user is presented with a second graphical user interface as will be described.

Figure 6:
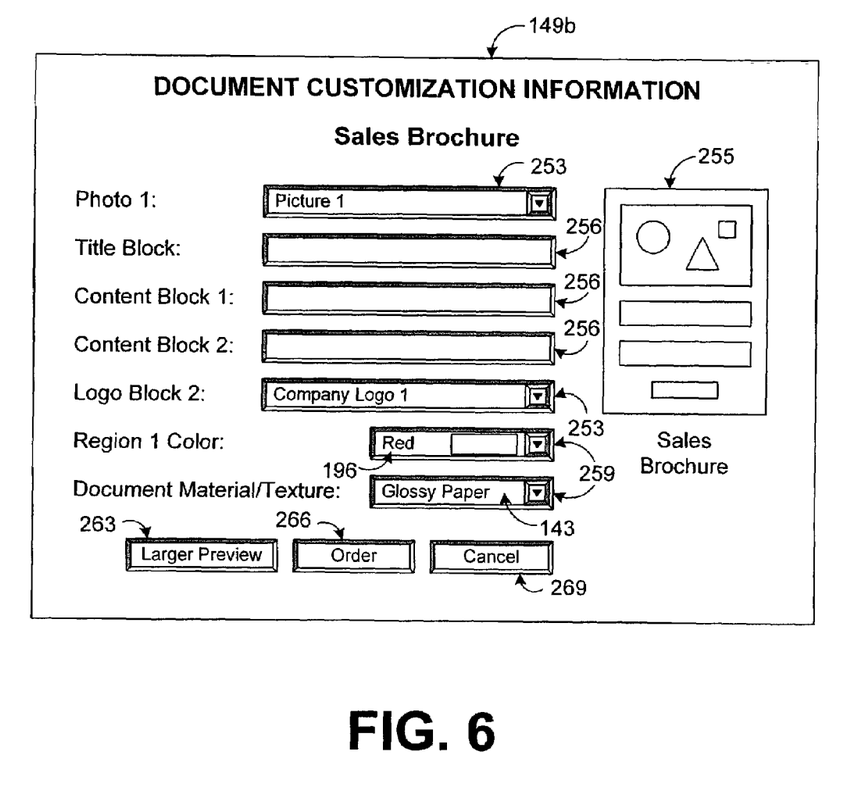
FIG. 6 is an exemplary second graphical user interface generated by the variable data document system of FIG. 1 to facilitate a user specification of the number of elements of FIGS. 2A, 2B, and 2C according to an embodiment of the present invention.

With reference to FIG. 6, shown is an exemplary second graphical user interface 149*b* that is rendered on the display device 173 (FIG. 1) when the user selects one of the variable data documents 236 (FIG. 5) in the first graphical user interface 149*a* (FIG. 5). The second graphical user interface 149*b* includes, for example, one or more drop down lists 253 or other selection devices that may be manipulated by a user to select a particular content item 146 to be populated in a respective region in the variable data document 236 (FIG. 5) that is being configured. The second graphical user interface 149*b* also includes a thumbnail view 255 of the variable data document 236 that allows a user to preview the variable data document as it is being created.

The second graphical user interface 149*b* also includes one or more data entry fields 256 into which the user may enter desired text that appears in predetermined regions of the variable data documents 236. The second graphical user interface also includes one or more drop down lists 259 or other selection mechanism that provides a user with the ability to select values for document elements other than the content items 146 such as, for example, a color 196 of predetermined regions and a texture 143 of the variable data document 236. As shown, the selectable elements are the same as those elements included in the proofing portfolio 200 (FIG. 3).

The second graphical user interface 149*b* also includes a "Larger Preview" button 263, an "Order button" 266, and a "Cancel" button 269. In order to see a larger view of the variable data document 236, the user may click on the larger preview button 263 resulting in a third graphical interface generated on the display device 173 that provides a larger view of the variable data document. Note that the view provided will not be of an actual size that the user may employ to print out the document on a local printer rather than ordering it from a print shop.

In order to order a number of copies to be printed of the variable data document 236 as configured in the second graphical user interface 149*b* from a print shop, the user may click on the order button 266. This causes a fourth graphical interface to be generated on the display device 173 that is used to acquire such information from the user as is necessary to complete the order and transmit the order to the respective print shop via the network 109 (FIG. 1). Such a user interface may be, for example, a form that solicits the necessary order information such as, for example, the user name, address, billing address, account numbers, number of copies to be printed, required delivery dates, and other information. In addition, the user may be required to enter the portfolio identifier and/or a print date of the proofing portfolio 200. Such information is then provided to the print shop.

Figure 7:
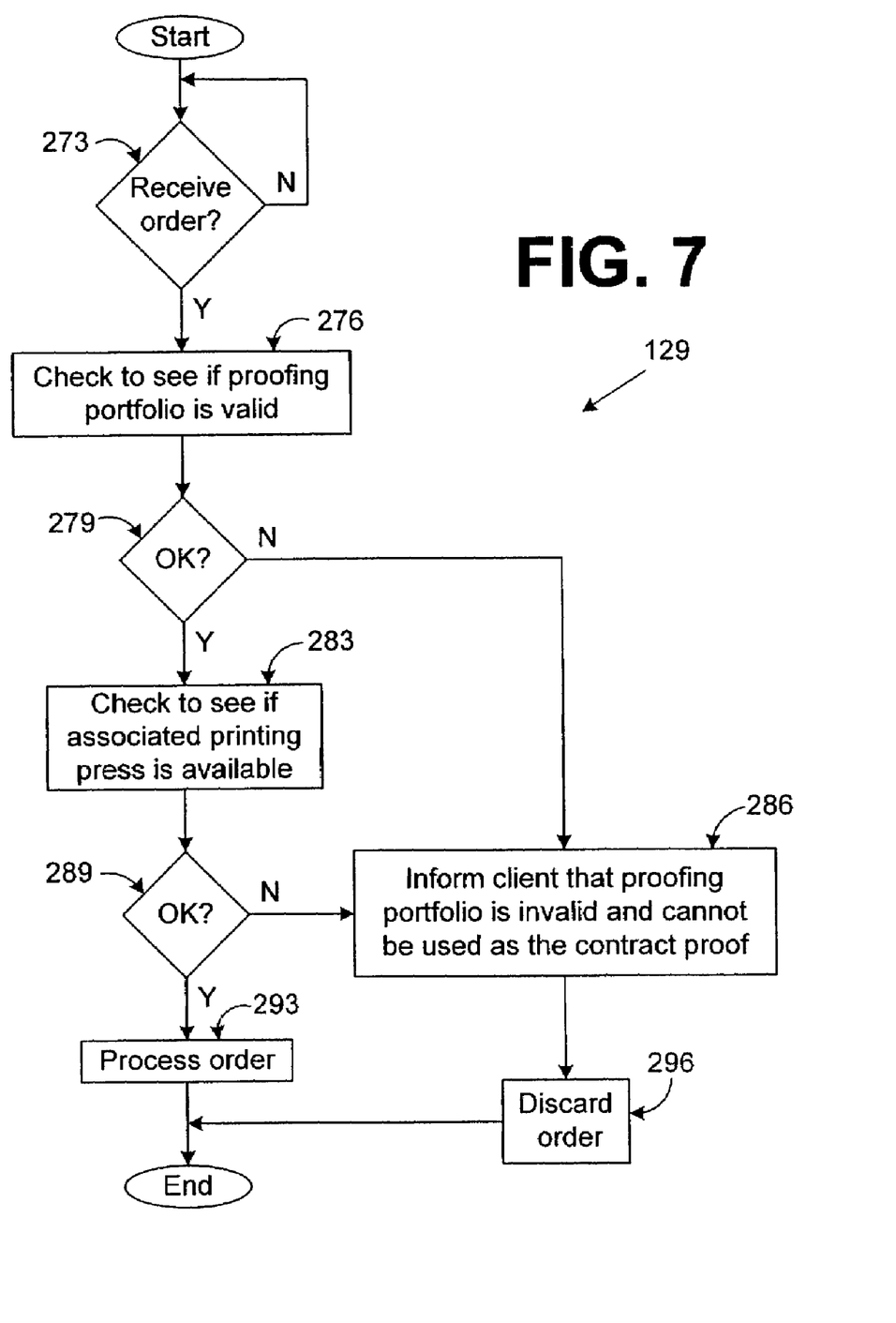
FIG. 7 is a flow chart of an exemplary order processor portion of the variable data document system of FIG. 1.

With reference to FIG. 7, shown is a flow chart of the operation of the order processor 129 which is executed as a portion of the variable data document system 126 (FIG. 1) in processing an order received from the client 106 (FIG. 1). Alternatively, the flow chart of FIG. 7 may be viewed as depicting the steps of a method implemented in the printing server 103 to process an order received from the client 106. The order processor 129 is executed as a portion of the variable data document system 126 in order to insure the validity of a proofing portfolio 200 (FIG. 3) associated with an order is valid before the order is processed.

Beginning with box 273, the order processor 129 waits to receive an order from the client 106. Once that order is received, then in box 276 the order processor 129 checks the order to determine if the proofing portfolio 200 (FIG. 3) that is associated with the order is valid. This may be done by comparing the current date with a print date associated with the proofing portfolio 200 in the portfolio table 133 (FIG. 1) to determine whether a predetermined period of time has lapsed since the printing of the proofing portfolio 200. Then, in box 279 if the proofing portfolio 200 is valid, then the order processor 129 proceeds to box 283, otherwise the order processor 129 moves to box 286.

In box 283, the order processor 129 checks to see if the printing press that is associated with the proofing portfolio 200 identified in the order is available for printing. For example, there may be situation in which the printing press is inoperable due to needed repairs or the use of the identified printing press may be discontinued. In such case, the print shop needs to supply a new proofing portfolio 200 that was printed on an operational printing press to the user for future orders. Otherwise, a disparity may occur between the appearance of the content items 146a (FIG. 3) and the color samples 139a (FIG. 3), etc., as printed by a different printing press and the same elements as the appear in the proofing portfolio 200. In order to determine which printing press is associated with the proofing portfolio 200 that is in turn associated with the order, the order processor 129 may consult the portfolio table 133 where such association is maintained. Alternatively, another database or other data structure may be employed.

In order to facilitate such inquiries, the operator of the printing server 103 periodically maintains the status of all printing presses in the variable data documents system 126 as well as all other pertinent information. Then, in box 289 if the associated printing press is not available, then the order processor 129 moves to box 286. Otherwise, the order processor 129 proceeds to box 293 in which the order is processed. Such processing may include, for example, printing out the order for print shop personnel so that they may begin the printing of the variable data document that was ordered. Thereafter, the order processor 129 ends.

Referring back to box 286, it is assumed that the proofing portfolio is invalid for the reasons determined in box 276 or box 283. In such case, the client device 106 and the user thereof is informed that the proofing portfolio 200 that they currently hold is invalid and that they need to contact the print shop for a new proofing portfolio 200 in order to complete the order. Thereafter, in box 296, the order is discarded. Then, the order processor 129 ends.

Thus, the order processor 129 checks to ensure that the proofing portfolio 200 that is to be used as a contact proof for the printing of specified variable data document 236 is valid. This ensures that a user who receives the printed variable data document does not suddenly perceive a disparity between the elements displayed in the proofing portfolio 200 and the same elements that appear in the printed variable data document 236. This is accomplished while at the same time eliminating the use of printing an expensive print proof before printing the actual document.

Although the variable data document system 126 is embodied in software or code executed by general purpose hardware as discussed above, as an alternative it may also be embodied in dedicated hardware or a combination of software/general purpose hardware and dedicated hardware. If embodied in dedicated hardware, the variable data document system 126 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

In addition, the flow chart of FIG. 7 shows the architecture, functionality, and operation of an implementation of the order processor 129. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the variable data document system 126 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the variable data document system 126 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A system for providing print approval, comprising:
   a variable data document system employed to create a variable data document, the variable data document system providing for a digital specification of at least one element of the variable data document;
   a proofing portfolio that is associated with the variable data document system, the proofing portfolio including a physical embodiment of the at least one element of the variable data document, the proofing portfolio being associated with a printing press and the proofing portfolio being valid for a predefined period of time; and
   the proofing portfolio comprising a plurality of sample documents, wherein a plurality of textures are represented in the sample documents.

2. The system of claim 1, wherein:
   the at least one element further comprises at least one of a number of content items that is placed in a copyhole of the variable data document; and
   the physical embodiment of the at least one element further comprises a hardcopy version of the at least one of the content items.

3. The system of claim 1, wherein:
   the at least one element further comprises a texture of the variable data document; and
   the physical embodiment of the at least one element further comprises one of the textures represented in the sample documents.

4. The system of claim 1, wherein:
   the at least one element further comprises a color of the variable data document; and
   the physical embodiment of the at least one element further comprises one of a plurality of colors represented in the sample documents.

5. The system of claim 1, wherein the proofing portfolio further comprises a portfolio identifier.

6. The system of claim 1, wherein the proofing portfolio further comprises a print date that indicates a date upon which the proofing portfolio was printed.

7. The system of claim 1, wherein the proofing portfolio further comprises an expiration date that indicates a date upon which the proofing portfolio becomes invalid.

8. The system of claim 5, wherein the portfolio identifier associates the proofing portfolio with the printing press.

9. The system of claim 5, wherein the portfolio identifier associates the proofing portfolio with a print date.

10. A system for providing print approval, comprising:
    means for creating a variable data document by providing for a digital specification of at least one element of the variable data document; and
    a proofing portfolio that is associated with the means for creating a variable data document, the proofing portfolio including a physical embodiment of the at least one element of the variable data document, the proofing portfolio being associated with a printing press and the proofing portfolio being valid for a predefined period of time; and
    the proofing portfolio comprising a plurality of sample documents, wherein a plurality of textures are represented in the sample documents.

11. A proofing portfolio for providing print approval, comprising:
    at least one hardcopy version of a content item, the content item being one of a number of content items provided in a variable data document system associated with the proofing portfolio;
    a number of texture samples, each of the number of texture samples embodying one of a number of document textures provided in the variable data document system; and
    a number of color samples, each of the color samples embodying one of a number of document colors provided in the variable data document system.

12. The proofing portfolio of claim 11, wherein at least one of the texture samples and at least one of the color samples combined into a single sample.

13. The proofing portfolio of claim 11, further comprising:
    a template sample that includes a copyhole; and
    wherein the hardcopy version of the content item is substantially the same size as the copyhole.

14. The proofing portfolio of claim 11, further comprising a portfolio identifier that associates the proofing portfolio with a printing press.

15. The proofing portfolio of claim 11, further comprising a print date that indicates a date upon which the proofing portfolio was printed.

16. A method for proofing a print, comprising:
    specifying a variable data document using a variable data document system, the variable data document to be mass printed on a printing press;
    generating an order for the variable data document from a print vendor; and
    associating a proofing portfolio comprising a plurality of sample documents presenting a plurality of texture samples with the order as a contract proof.

17. The method of claim 16, wherein the associating of the proofing portfolio with the order as the contract proof further comprises including a portfolio identifier in the order, the portfolio identifier being associated with the proofing portfolio.

18. The method of claim 16, wherein the associating of the proofing portfolio with the order as the contract proof further comprises including a print date in the order, the print date indicating a date upon which the proofing portfolio was printed.

19. The method of claim 16, wherein the specifying of the variable data document using the variable data document system further comprises drawing an association between a content item identified by the variable data document system that may be selected for inclusion in the variable data document and a hardcopy version of the content item included in the proofing portfolio.

20. The method of claim 19, wherein the specifying of the variable data document using the variable data document system further comprises selecting the content item for inclusion in the variable data document.

21. The method of claim 16, wherein the specifying of the variable data document using the variable data document system further comprises drawing an association between one of the texture samples in the proofing portfolio and a texture identified by the variable data document system that may be selected for the variable data document.

22. The method of claim 21, wherein the specifying of the variable data document using the variable data document system further comprises selecting the texture as a characteristic of the variable data document.

23. The method of claim 16, wherein the specifying of the variable data document using the variable data document system further comprises drawing an association between one of a plurality of color samples in the proofing portfolio and a color identified by the variable data document system that may be selected for the variable data document.

24. The method of claim 23, wherein the specifying of the variable data document using the variable data document system further comprises selecting the color as a characteristic of the variable data document.

25. A printing method, comprising:
providing a variable data document system that is used to create a variable data document, the variable data document system providing for a specification of at least one element of the variable data document
providing a proofing portfolio that is associated with the variable data document system, the proofing portfolio including a physical embodiment of the at least one element of the variable data document, the proofing portfolio comprising a plurality of sample documents, wherein a plurality of textures are represented in the sample documents:
receiving an order for a printing of a number of copies of the variable data document, wherein the proofing portfolio is associated with the order; and
printing the number of copies of the variable data document if the proofing portfolio is valid.

26. The printing method of claim 25, wherein the providing of the proofing portfolio that is associated with the variable data document system further comprises:
printing the proofing portfolio using a printing press; and
providing the proofing portfolio to a customer to facilitate proofing of the variable data document.

27. The printing method of claim 25, further comprising determining whether the proofing portfolio is valid.

28. The printing method of claim 27, wherein the determining of whether the proofing portfolio is valid further comprises determining whether a validity time period of the proofing portfolio has expired.

29. The printing method of claim 27, wherein the determining of whether the proofing portfolio is valid further comprises determining whether a printing press employed to create the proofing portfolio is available to print the variable data document.

30. The printing method of claim 28, wherein the determining of whether the validity time period of the proofing portfolio has expired further comprises:
determining an expiration date associated with the proofing portfolio based upon the portfolio identifier; and
determining whether the expiration date has passed.

31. A program embodied in a computer-readable medium for screening an order for mass printing of a variable data document for validity, comprising:
code that identifies a proofing portfolio associated with an order for mass printing of a variable data document received from a client;
code that determines whether the proofing portfolio is valid, wherein the proofing portfolio comprises a plurality of sample documents, the sample documents comprising a plurality of color samples and a plurality of texture samples; and
code that informs the client that the proofing portfolio is invalid and that the order cannot be honored when the proofing portfolio is invalid.

32. The program embodied in a computer-readable medium of claim 31, further comprising:
code that determines whether a printing press associated with the proofing portfolio is available for mass printing of the variable data document; and
code that informs the client that the proofing portfolio is invalid and that the order cannot be honored when the printing press is not available for mass printing of the variable data document.

* * * * *

UNITED STATES PATENT AND TRADEMARK OFFICE
CERTIFICATE OF CORRECTION

| | |
|---|---|
| PATENT NO. | : 7,184,168 B2 |
| APPLICATION NO. | : 10/135109 |
| DATED | : February 27, 2007 |
| INVENTOR(S) | : Orhan E. Beckman et al. |

It is certified that error appears in the above-identified patent and that said Letters Patent is hereby corrected as shown below:

In column 13, line 35, in Claim 25, delete "document" and insert -- document; --, therefor.

In column 13, line 42, in Claim 25, delete "documents:" and insert -- documents; --, therefor.

Signed and Sealed this

Eighteenth Day of August, 2009

David J. Kappos
*Director of the United States Patent and Trademark Office*